United States Patent [19]

Durham

[11] Patent Number: 5,702,006
[45] Date of Patent: Dec. 30, 1997

[54] WORKSTAND FOR BICYCLES

[76] Inventor: Roger O. Durham, 1370 Thompson Ave., Glendale, Calif. 91201

[21] Appl. No.: 538,565

[22] Filed: Oct. 3, 1995

[51] Int. Cl.$^6$ .................................................... A47F 7/00
[52] U.S. Cl. ................................................................ 211/18
[58] Field of Search ................................ 211/18, 17, 22

[56] References Cited

U.S. PATENT DOCUMENTS

| | | | |
|---|---|---|---|
| 4,700,845 | 10/1987 | Fretter | 211/18 |
| 4,840,278 | 6/1989 | Gelinas | 211/18 |
| 5,082,123 | 1/1992 | Lamb | 211/18 X |

*Primary Examiner*—Alvin C. Chin-Shue
*Assistant Examiner*—Sarah L. Purol

[57] ABSTRACT

A bicycle workstand is mounted to a support structure, such as a wall or post. The workstand includes a handlebar support, which has two spaced-apart, concave-upward nests for supporting the bicycle's handlebars, and a saddle engagement means, mounted above, which positions the bicycle saddle in close proximity to the support structure.

Thus, the bicycle is mounted vertically with its wheels extending out from the support structure, with the front wheel above the floor, free to turn, and with the center of the rear wheel at about eye level.

The bicycle workstand can also serve as an economical storage rack.

3 Claims, 2 Drawing Sheets

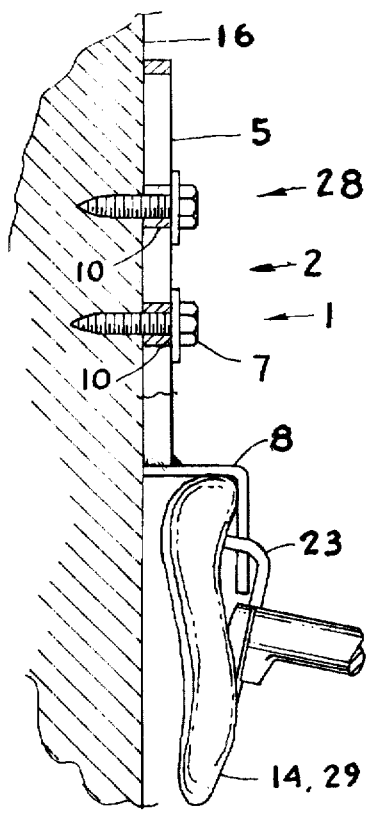
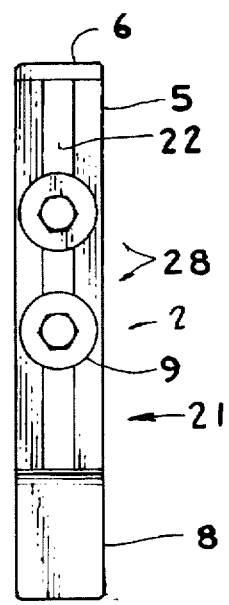
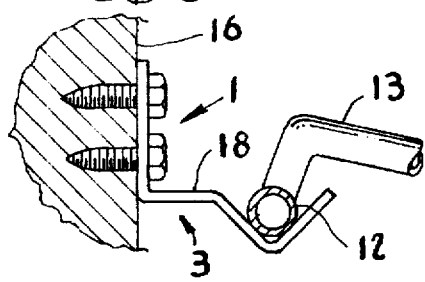
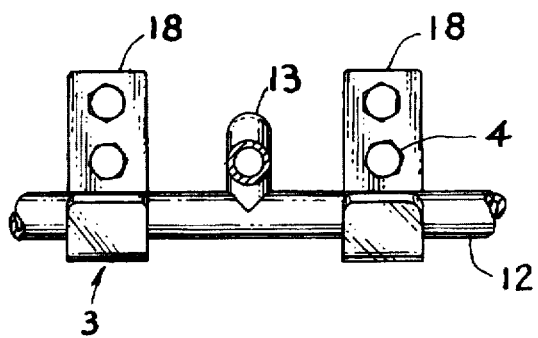
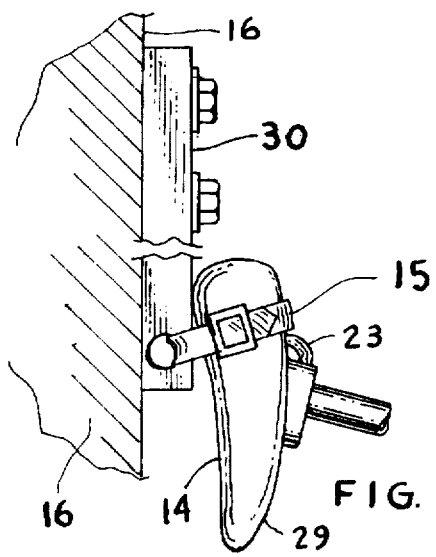
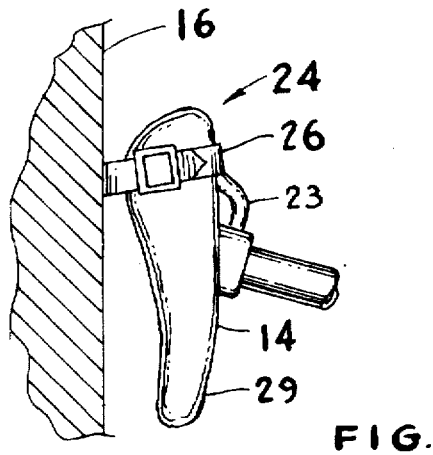
FIG. 1
FIG. 2
FIG. 3
FIG. 4
FIG. 5

WORKSTAND FOR BICYCLES

CROSS REFERENCES TO RELATED APPLICATIONS

None

BACKGROUND OF THE INVENTION

A) FIELD OF THE INVENTION

This invention pertains to repair stands and storage racks for bicycles, in which the two devices may be combined.

(B) DESCRIPTION OF THE PRIOR ART

Current bicycle shop repair stands are usually pedestal mounted units which allow the bicycle to be supported in any position. They are usually located in the middle of the shop repair area, to allow access to the bicycle from all sides. They are usually too heavy, too expensive, and take up too much space for home use. They work very well.

For home use, the most common workstand is one which mounts under the bicycle and supports it in a normal position with its rear wheel one or two inches off the floor, with its front wheel resting on the floor. Such workstands require the user to sit on the floor and work near the ground in an uncomfortable and awkward manner, and care must be taken, lest the bicycle fall over. Such units are inexpensive and portable.

After a bicycle has once been assembled, repairs or adjustments seldom need to be made to the handlebars or seat, and when they do, a repair stand isn't much needed. Most commonly, repairs need to be made to the wheels, tires, chain, pedals, and particularly to the derailleur and shift mechanisms. All these are accessible with the bicycle mounted vertically.

SUMMARY OF THE INVENTION

According to the invention, a workstand includes a handlebar support means mounted to a support structure, such as a wall or post, and a saddle engagement means mounted above it. The handlebar support means has two spaced-apart, concave-upward nests for engagement with a bicycle's handlebars. The saddle engagement means, which preferably accomodates different-sized bicycles, positions the bicycle saddle in close proximity to the support structure. The bicycle's wheels extend out from the support structure, and the front wheel is above the floor and free to turn.

Such an arrangement provides easy access, for inspection, cleaning, and maintenance, to both wheels, and to the drive mechanism. The center of the rear wheel is almost at eye level. The crank can be turned and the chain shifted from one rear or front sprocket to another. The brakes can be actuated and inspected.

The bicycle is stored vertically in a minimum amount of space, making its use as a storage rack applicable to an apartment, garage, or patio.

The workstand could be used as a storage rack on trains, buses, and possibly airliners as well. It would also conserve space when used to store bicycles at depots, airports, and stations.

Since the support structure is usually part of an existing structure, such as a wall, door, or post, the workstand itself is inexpensive to produce. It performs almost as well as a large shop repair workstand.

BRIEF DESCRIPTION OF THE DRAWINGS

FIG. 1 shows a side elevation of a workstand mounted to a support structure, such as a wall, with a saddle engagement means mounted above a handlebar support means. The saddle engagement means is shown to be a slide means for engagement with the rear of a bicycle saddle.

FIG. 2 shows a view, taken along line 2—2 of FIG. 1, of a slide means by itself.

FIG. 3 shows a view, taken along line 3—3 of FIG. 1, of a handlebar support means comprising a pair of spaced-apart, concave-upward handlebar support nests which support a bicycle's handlebars.

FIG. 4 shows a bicycle saddle secured by a slide means having an adjustable strap fixed to its lower end, wherein the adjustable strap engages the saddle.

FIG. 5 shows a bicycle saddle secured to a support structure by an adjustable strap by itself, wherein no slide means is employed.

DETAILED DESCRIPTION OF THE DRAWINGS

Figure 6:
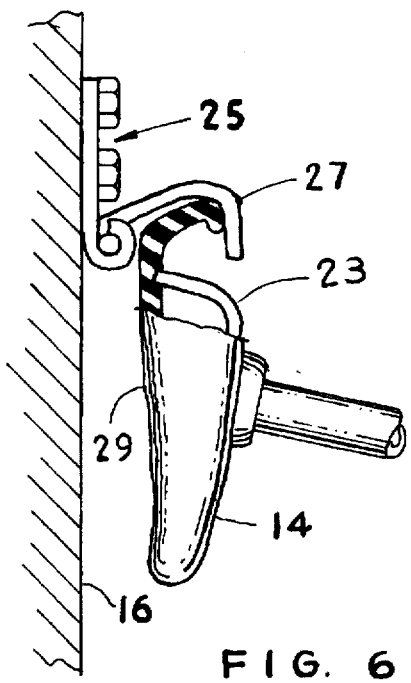
FIG. 6 shows a bicycle saddle secured to a support structure by a saddle engagement means which is shown to be a pivotable hook.

Referring to the preferred embodiment of FIG. 1, a workstand for a bicycle having handlebars and a saddle is shown mounted to a support structure 16, such as a wall. The workstand 1 is comprised of a handlebar support means 3, and a saddle engagement means 2 mounted above it.

Said handlebar support means 3 includes a pair of spaced-apart, concave-upward nests 18, which support a pair of bicycle handlebars 12. Each of said nests 18 is secured to said support structure 16 by a pair of fasteners 4.

Said saddle engagement means 2 is comprised of a slide means 21, and a guide means 28.

Said slide means 21 includes a pair of spaced-apart slide rails 5, a header bar 6, and a saddle engagement tongue 8. At their upper ends, said slide rails 5 are spaced apart by said header bar 6.

Said slide rails 5 are spaced apart at their lower ends by said saddle engagement tongue 8, which is secured to said slide rails 5 by welding or brazing. The spaced-apart slide rails 5 thus form a slot 22 between them.

Said guide means 28 includes a pair of vertically spaced-apart fasteners 7 which engage a pair of washers 9, engage a pair of bushings 10, and thread into said support structure 16. Said guide means thus loosely secures said slide means 21 to said support structure 16 and guides said slide means 21 in a vertical path.

A bicycle saddle 14 includes a saddle cover 29 and a pair of spaced-apart saddle support bars 23, said saddle 14 being engaged by said saddle engagement tongue 8 of said slide means 21 of said saddle engagement means 2. Said saddle engagement tongue 8 extends loosely between said saddle support bars 23 and prevents the bicycle from falling to one side.

A pair of handlebars 12 is shown to be supported in said nests 18 of said handlebar support means 3. A bicycle gooseneck 13 is appear secured to said handlebars 12.

FIG. 4 shows a strap 15 being used, with a slide means 30, similar to said slide means 21 of FIGS. 1 and 2, to secure the saddle 14.

In FIG. 5, a saddle engagement means 24 is simply a strap means 26, which is secured to said support structure 16. The arrangement shown in FIG. 5 is useful in supporting bicycles of nearly the same size, since there is no vertical adjustment.

In FIG. 6, a saddle engagement means 25 is comprised of a pivotally supported hook means 27, similar to a common strap hinge which is secured to said support structure 16. The saddle engagement means 25 of FIG. 6 is also useful in supporting bicycles of approximately the same size, because very little vertical adjustment is provided.

Figure 7:
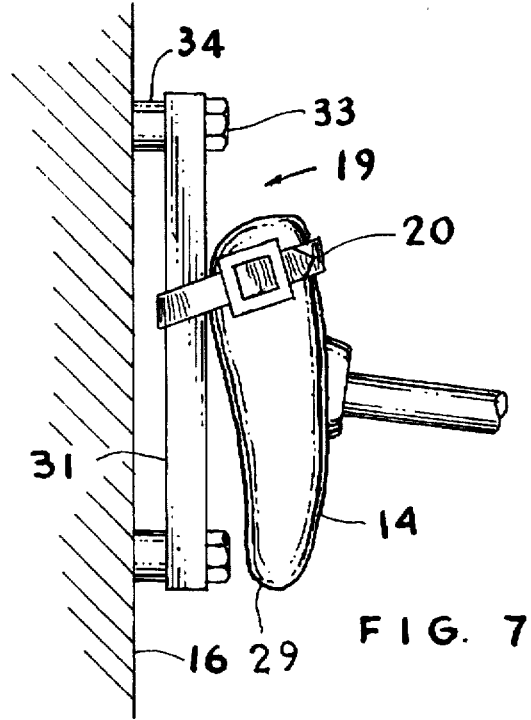
FIG. 7 shows bicycle saddle secured to a wall by a saddle engagement means which includes a vertical bar, which is spaced away from the support structure, and an adjustable strap.

In FIG. 7, a saddle engagement means 19 is shown to include a vertical slidebar 31 which is secured to, and spaced away from, said support structure 16 by a pair of fasteners 33 which insert through holes in said vertical slide bar 31, through holes in a pair of spacers 34, and engage said support structure 16, and a strap 20 which encircles the slide bar and engages the saddle 14.

Figure 8:
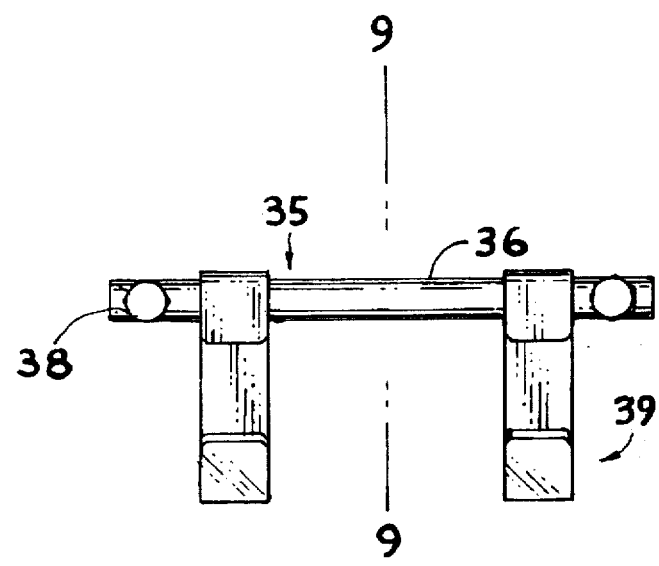
FIG. 8 shows an alternate nest arrangement which allows the handlebar nests to be adjustably spaced apart to fit the handlebars of a particular bicycle.

In FIG. 8, an alternate handlebar support means 35 is shown to include a horizontal slide bar 36 which is secured to said support structure 16 by a pair of spaced-apart fasteners 38 which pass through holes in said horizontal slide bar 36, through spacers which aren't shown, and engage said support structure 16. A pair of adjustable, spaced-apart concave-upward nests 39 slidably engage said slide bar 36 and provide support for a bicycle's handlebars.

Figure 9:
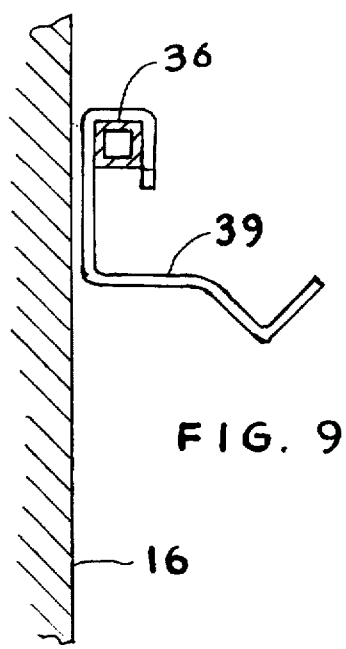
FIG. 9 is a section taken along line 9—9 of FIG. 8.

FIG. 9 shows the handlebar nest 39, the slide bar 36, and the support structure 16 in cross section.

MODE OF OPERATION

The handlebar support means 3 of FIGS. 1 and 3 is mounted at a height above the floor which will allow the front wheel of the bicycle to clear the floor by two or three inches.

A bicycle is installed in the workstand by lifting the rear wheel and guiding the handlebars into position in the nests 18.

The saddle engagement means 2 is lowered onto the bicycle saddle 14, and said tongue 8 engages said saddle 14.

The weight of the bicycle is carried by the handlebar support means 3, and the saddle 14 is secured above. The saddle engagement means 2 positions the saddle 14 in close proximity to the support structure 16 and prevents the bicycle from falling either away from the support structure or to the side.

The bicycle is thus stored with its rear wheel mechanism which needs the most attention, at about eye level. Both wheels may be removed for service. The bicycle's crankshaft can be turned to observe the action of the chain drive mechanism. The lower portions of the bicycle, which most often need cleaning and attention are accessible.

Thus is provided a workstand which locates the bicycle in a convenient vertical position for service, and which stores the bicycle in a minimum amount of floor space.

In many cases, the workstand of the invention could be mounted to separate support members rather than to a single support structure; the requirement is that the saddle engagement means be mounted, somehow, a suitable distance above the handlebar support means.

A wide variety of handlebar support means can be thought of, such as support means which include straps, clamps, elastic, or velcro bindings. By 'handlebar support means' is intended to include all such ordinary, non-inventive ways of supporting a bicycle's handlebars.

Similarly, the supply of saddle engagement means has by no means been exhausted by the examples shown in this application. 'Saddle engagement means' is here taken to include all ordinary ways of engaging either a saddle or a part of the bicycle near to the saddle, such as a seatpost or part of its frame, such as the top tube.

The crux of the invention, as seen by the applicant, is that by positioning the bicycle vertically with its front wheel down and its rear wheel above it, the bicycle is placed in an ideal position for both service and storage, and that other positions aren't necessary.

I claim:

1. In a workstand for bicycles having handlebars and a saddle, said workstand mounted to a support structure, the combination of;

a) a handlebar support means mounted to said support structure, said handlebar support means including a pair spaced-apart, concave-upward nests for supporting the bicycle handlebars;

b) a saddle engagement means for positioning said bicycle saddle in close proximity with said support structure, said saddle engagement means mounted to said support structure, said saddle engagement means including a slide means with a saddle engagement tongue and a guide means adapted for guiding said slide means in a vertical path, whereby said slide means engages said bicycle saddle.

2. In a workstand for bicycles having handlebars and a saddle, said workstand mounted to a support structure, the combination of;

a) a handlebar support means mounted to said support structure, said handlebar support means including a pair of spaced-apart, concave-upward nests for supporting the bicycle handlebars;

b) a saddle engagement means for positioning said bicycle saddle in close proximity with said support structure, said saddle engagement means mounted to said support structure, said saddle engagement means including a slide means, a guide means for guiding said slide means in a vertical path, and a strap secured to said slide means for securing said bicycle saddle to said slide means.

3. In a workstand for bicycles having handlebars and a saddle, said workstand mounted to a support structure, the combination of;

a) a handlebar support means mounted to said support structure, said handlebar support means including a pair of spaced-apart, concave-upward nests for supporting the bicycle handlebars;

b) a saddle engagement means for positioning said bicycle saddle in close proximity with said support structure, said saddle engagement means mounted to said support structure, said saddle engagement means is a vertical slide bar which is secured to and spaced away from the support structure, and a strap which encircles the vertical slide bar and engages the bicycle saddle.

* * * * *